US012682209B2

(12) United States Patent
Lee

(10) Patent No.: US 12,682,209 B2
(45) Date of Patent: Jul. 14, 2026

(54) SYSTEM AND METHOD FOR SECURELY UPDATING NEURAL NETWORK PARAMETERS ON EDGE DEVICES WITH PRE-STORED ARCHITECTURES

(71) Applicant: REALTEK SEMICONDUCTOR CORP., Hsinchu (TW)

(72) Inventor: Cheng-Hao Lee, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 690 days.

(21) Appl. No.: 18/107,806

(22) Filed: Feb. 9, 2023

(65) Prior Publication Data

US 2024/0062037 A1 Feb. 22, 2024

(30) Foreign Application Priority Data

Aug. 18, 2022 (TW) .................................. 111131208

(51) Int. Cl.
*G06N 3/04* (2023.01)
(52) U.S. Cl.
CPC ...................................... *G06N 3/04* (2013.01)
(58) Field of Classification Search
None
See application file for complete search history.

(56) References Cited

U.S. PATENT DOCUMENTS

| 10,719,613 B1 | 7/2020 | Rotem et al. | |
| 2020/0272899 A1* | 8/2020 | Dunne | G06N 3/082 |
| 2022/0156550 A1* | 5/2022 | Zhang | G06F 21/606 |

OTHER PUBLICATIONS

Aarrestad et al., Fast convolutional neural networks on FPGAs with hls4ml; Mach. Learn.: Sci. Technol. 2; Jul. 16, 2021; https://doi.org/10.1088/2632-2153/ac0ea1; Total pp. 25 (Year: 2021).*
Hsu et al., A Cloud-Edge-Smart IoT Architecture for Speeding Up the Deployment of Neural Network Models with Transfer Learning; Electronics 2022, 11, 2255. https://doi.org/10.3390/electronics11142255; Jul. 19, 2022; Total pp. 15 (Year: 2022).*
Parthasarathy et al., DEFER: Distributed Edge Inference for Deep Neural Networks; arXiv:2201.06769v1 [cs.LG] Jan. 18, 2022; Total pp. 5 (Year: 2022).*

* cited by examiner

*Primary Examiner* — Alan Chen
(74) *Attorney, Agent, or Firm* — Birch, Stewart, Kolasch & Birch, LLP

(57) ABSTRACT

A neural network system and an operation method for a neural network system are provided. The neural network system includes at least one edge device and a server. Each edge device stores a neural network architecture. The neural network architecture includes at least one operator and a model identifier, and the at least one operator of the neural network architecture stored in the each edge device includes an operator identifier. The server is connected to the each edge device. The each edge device is configured to, upon being powered on, transmit the operator identifier of each operator to the server to request the server to return parameters for the each operator; receive the parameters of the each operator and combine the parameters of the each operator with the neural network architecture to obtain a neural network model; and execute a predetermined task based on the neural network model.

16 Claims, 7 Drawing Sheets

100          101

102-1          102-2          102-N

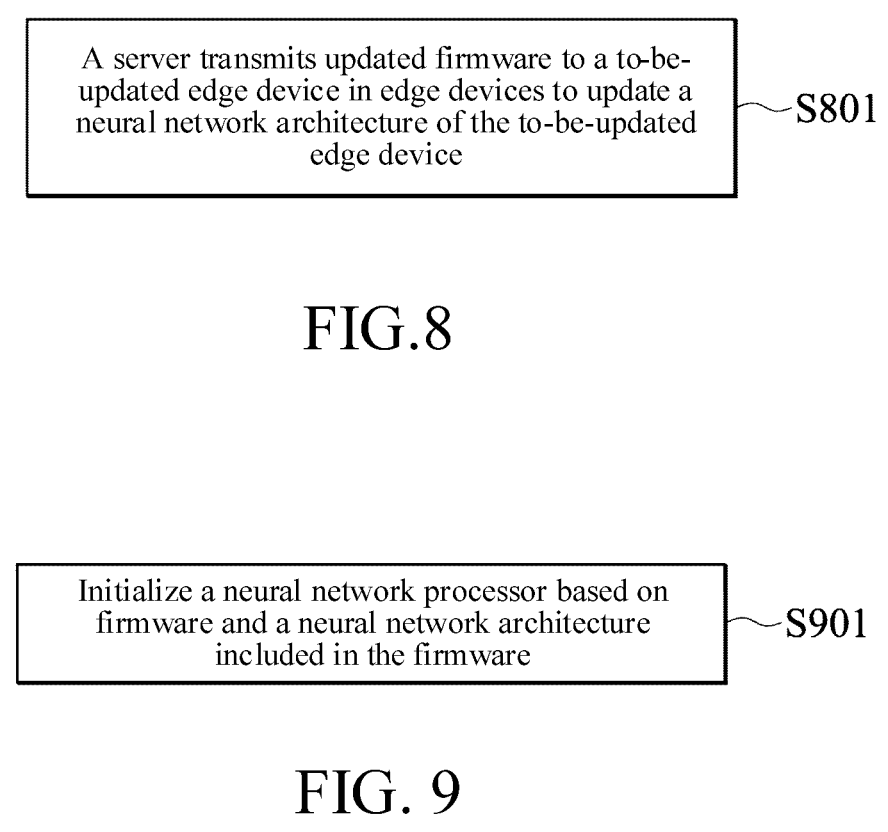

A server transmits updated firmware to a to-be-updated edge device in edge devices to update a neural network architecture of the to-be-updated edge device ——S801

FIG.8

Initialize a neural network processor based on firmware and a neural network architecture included in the firmware ——S901

FIG. 9

SYSTEM AND METHOD FOR SECURELY UPDATING NEURAL NETWORK PARAMETERS ON EDGE DEVICES WITH PRE-STORED ARCHITECTURES

CROSS-REFERENCE TO RELATED APPLICATION

This non-provisional application claims priority under 35 U.S.C. § 119(a) to Patent Application No. 111131208 filed in Taiwan, R.O.C. on Aug. 18, 2022, the entire contents of which are hereby incorporated by reference.

BACKGROUND

Technical Field

The present invention relates to the field of neural networks, and in particular, to the technology of updating and protecting parameters of neural networks.

Related Art

Due to the rise of application of edge devices, neural network models are deployed on increasingly more edge devices. In order to allow users to obtain better quality of service, the neural network model is often required to be redeployed on the edge device through a network. However, the architecture and parameters of the neural network model are important data for manufacturers, which are required to be transmitted to the edge device and the related system in a safe situation, so as not to be stolen by outsiders.

In view of the above, some embodiments of the present invention provide a neural network system and an operation method for a neural network system, to alleviate the problems of the prior art.

SUMMARY

Some embodiments of the present invention provide a neural network system. The neural network system includes at least one edge device and a server. Each edge device is configured to store a neural network architecture. The neural network architecture stored in the each edge device includes at least one operator and a model identifier, and the at least one operator of the neural network architecture stored in the each edge device includes an operator identifier. The server is connected to the at least one edge device. Each edge device is configured to: upon being powered on, transmit the operator identifier of each operator to the server to request the server to return a plurality of parameters for the each operator; receive the parameters of the each operator, and combine the parameters of the each operator with the neural network architecture to obtain a neural network model; and execute a predetermined task based on the neural network model.

Some embodiments of the present invention provide an operation method for a neural network system, applicable to the neural network system. The operation method for a neural network system includes: performing, by each edge device upon being powered on, steps of: transmitting the operator identifier of each operator to the server to request the server to return a plurality of parameters for the each operator; receiving the parameters of the each operator, and combining the parameters of the each operator with the neural network architecture to obtain a neural network model; and executing a predetermined task based on the neural network model.

Based on the above, according to the neural network system and the operation method for a neural network system provided in some embodiments of the present invention, the operator is used as a basic update unit to update the parameters of the neural network operator. Since the neural network architecture of the neural network model is pre-loaded into the edge device, the composition of the neural network is not required to be publicly transmitted on the Internet. In addition, since a name of the neural network and a category of the operator are replaced with identifiers, the important content of the neural network can be shielded, so that the outsider cannot reason about the details.

BRIEF DESCRIPTION OF THE DRAWINGS

FIG. 3-1 is a schematic diagram of convolution calculation according to an embodiment of the present invention.

FIG. 3-2 is a schematic diagram of values for convolution calculation according to an embodiment of the present invention.

FIG. 5-1 is a block diagram of an edge device system according to an embodiment of the present invention.

FIG. 5-2 is a block diagram of a server system according to an embodiment of the present invention.

FIG. 8 is a flowchart of an operation method for a neural network system according to an embodiment of the present invention.

FIG. 9 is a flowchart of an operation method for a neural network system according to an embodiment of the present invention.

DETAILED DESCRIPTION

Figure 1:
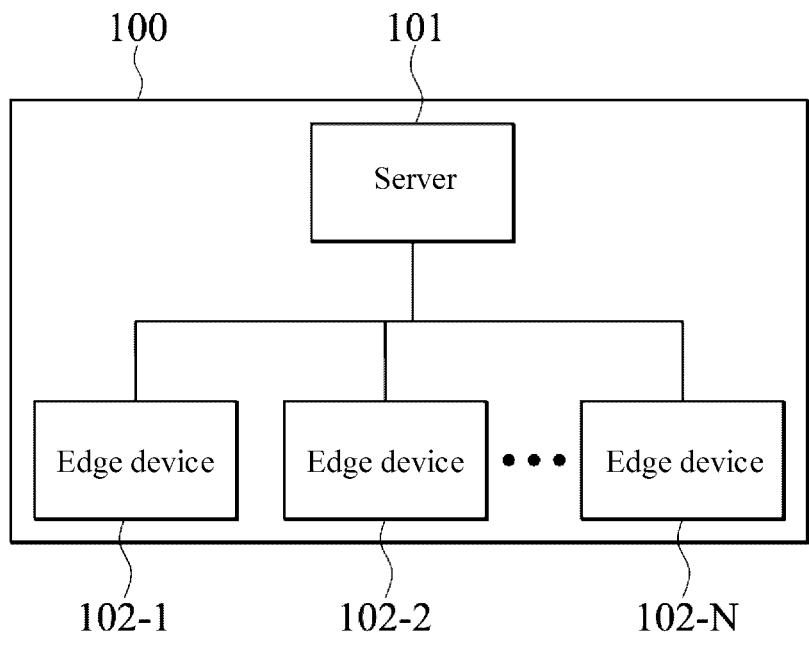
FIG. 1 is a block diagram of a neural network system according to an embodiment of the present invention.

The foregoing and other technical contents, features, and effects of the present invention can be clearly presented below in detailed description with reference to embodiments of the accompanying drawings. Any modifications and changes that do not affect the effect that the present invention can produce and the objects that can be achieved shall still fall within the scope covered by the technical content disclosed in the present invention. Same reference numerals are used to denote same or similar components in all of the drawings. The term "connect" mentioned in the following embodiments may be any direct or indirect and wired or wireless connection means.

FIG. 1 is a block diagram of a neural network system according to an embodiment of the present invention. Referring to FIG. 1, the neural network system 100 includes a server 101 and edge devices 102-1 to 102-N. N is a positive integer greater than 0. The server 101 is connected to the edge devices 102-1 to 102-N.

Figure 2:
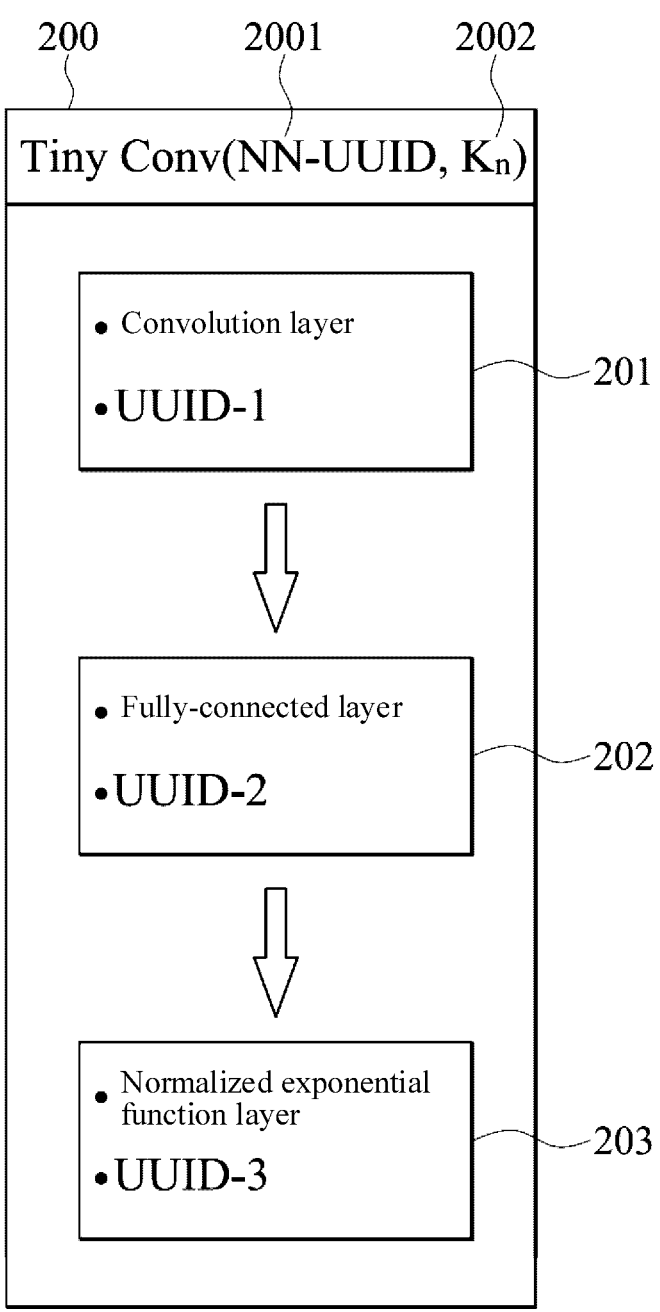
FIG. 2 is a schematic diagram of a neural network model according to an embodiment of the present invention.
Figures 1, 3:
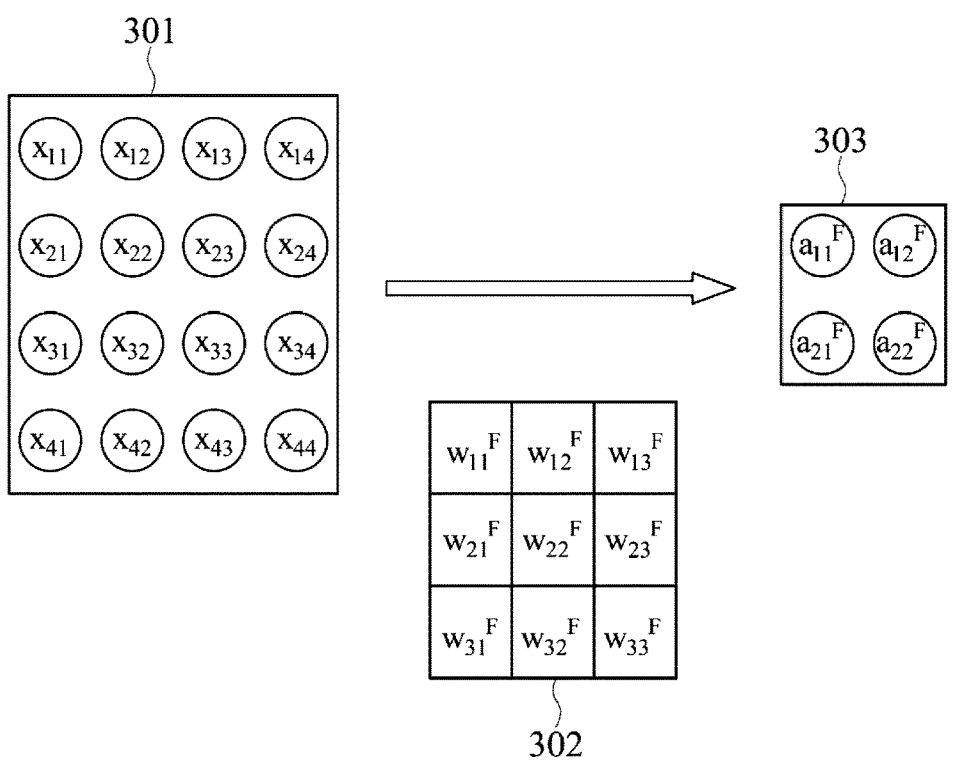
Figures 2, 3:
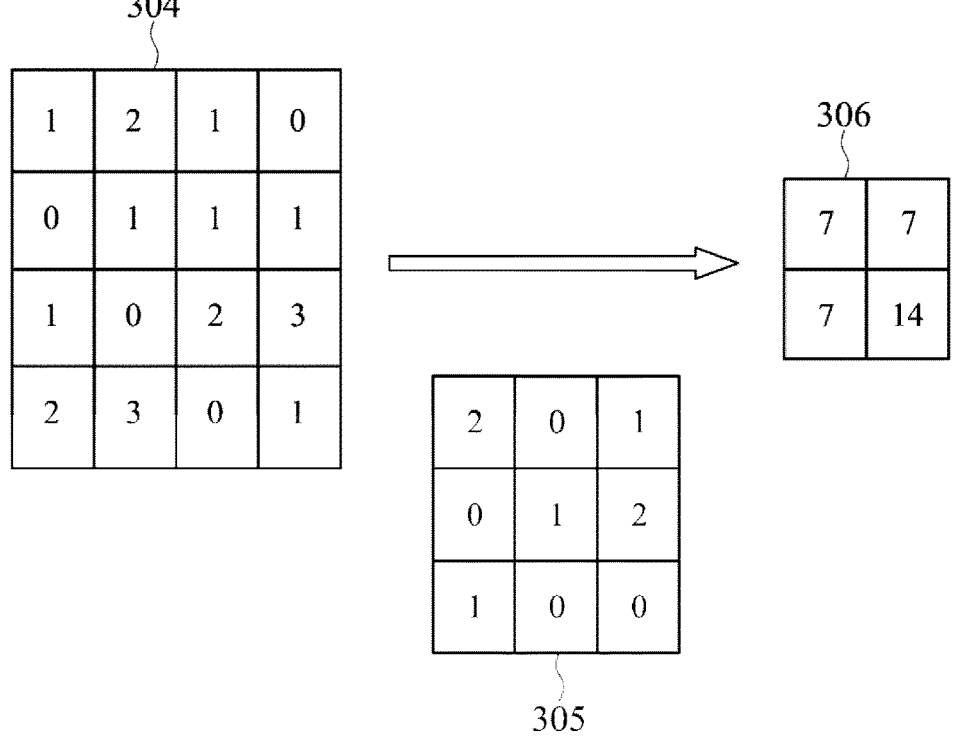
Figure 4:
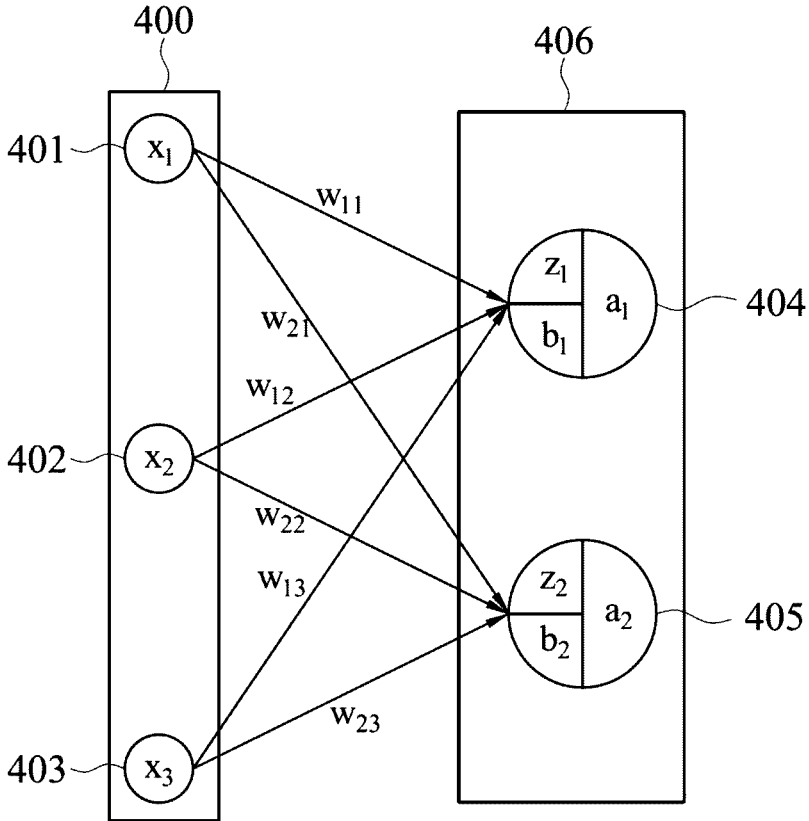
FIG. 4 is a schematic diagram of a fully-connected layer according to an embodiment of the present invention.

A neural network is composed of operation units, and the operation units are calculation functions involved in the neural network. These operation units are referred to as operators. For example, the neural network includes some layers, and each layer has operation logic of the layer, such as a convolution layer and convolution operation corresponding to the convolution layer, and a fully-connected layer and a summation process of the corresponding fully-connected layer based on a weight and a bias. The convolution layer is an operator, and the fully-connected layer is also an operator. Each operator has operation parameters. FIG. 2 is a schematic diagram of a neural network model according to an embodiment of the present invention. FIG. 3-1 is a schematic diagram of convolution calculation according to an embodiment of the present invention. FIG. 3-2 is a schematic diagram of values for convolution calculation according to an embodiment of the present invention. FIG. 4 is a schematic diagram of a fully-connected layer according to an embodiment of the present invention. The operator and the operation parameters of the operator are described below through FIG. 3-1, FIG. 3-2, and FIG. 4.

Referring to FIG. 3-1, FIG. 3-1 illustrates operation of a two-dimensional convolution layer. An input 301 is an input of the convolution layer, which has a two-dimensional structure. The input 301 includes 16 input values $x_{11}$, $x_{12}$, $x_{13}$, $x_{14}$, $x_{21}$, $x_{22}$, $x_{23}$, $x_{24}$, $x_{31}$, $x_{32}$, $x_{33}$, $x_{34}$, $x_{41}$, $x_{42}$, $x_{43}$, and $x_{44}$. A convolution kernel 302 has kernel weights $$w_{11}^F, w_{12}^F, w_{13}^F, w_{21}^F, w_{22}^F, w_{23}^F, w_{31}^F, w_{32}^F, \text{ and } w_{33}^F.$$

The input 301 is based on the convolution kernel 302 and the convolution with a step size of 1 is calculated by using the following equation:

$$a_{11}^F = w_{11}^F x_{11} + w_{12}^F x_{12} + \cdots + w_{33}^F x_{33},$$
$$a_{12}^F = w_{11}^F x_{12} + w_{12}^F x_{13} + \cdots + w_{33}^F x_{34},$$
$$a_{21}^F = w_{11}^F x_{21} + w_{12}^F x_{22} + \cdots + w_{33}^F x_{43}, \text{ and} \quad \text{(Equation 1)}$$
$$a_{22}^F = w_{11}^F x_{22} + w_{12}^F x_{23} + \cdots + w_{33}^F x_{44}.$$

The above calculation may mean first moving the convolution kernel 302 to a position of $x_{11}$ in the input 301, then multiplying a value of each kernel weight with the value of the input 301 at the corresponding position, and then adding up all products to obtain a value of $$a_{11}^F.$$

Then the convolution kernel 302 is moved to a position of $x_{12}$ in the input 301, and so on. Finally, a convolution output 303 for the input 301 is obtained based on the convolution kernel 302 with the step size of 1. Referring to FIG. 3-2, values of the input 304 and the convolution kernel 305 are shown in FIG. 3-2. According to the above (Equation 1), a value of a convolution output 306 may be calculated by using the following:

$$7 = 2 \cdot 1 + 0 \cdot 2 + \ldots + 0 \cdot 2,$$
$$7 = 2 \cdot 2 + 0 \cdot 1 + \ldots + 0 \cdot 3,$$
$$7 = 2 \cdot 0 + 0 \cdot 1 + \ldots + 0 \cdot 1, \text{ and}$$
$$14 = 2 \cdot 1 + 0 \cdot 1 + \ldots + 0 \cdot 1.$$

The convolution output 303 plus a bias $b^F$ is an overall output of the convolution layer. The convolution layer corresponding to the operation shown in FIG. 3-1 is an operator, and operation parameters of the operator are kernel weights $$w_{11}^F, w_{12}^F, w_{13}^F, w_{21}^F, w_{23}^F, w_{31}^F, w_{32}^F, \text{ and } w_{33}^F$$

and the bias $b^F$.

It should be noted that FIG. 3-1 and FIG. 3-2 are illustrative examples of operation of the two-dimensional convolution layer. In general application of a neural network, the neural network may include a 1-dimensional convolution layer or a high-dimensional convolution layer. The convolution layer may also have a plurality of convolution kernels, and the present invention is not limited to the illustrative examples shown in FIG. 3-1 and FIG. 3-2.

Referring to FIG. 4, FIG. 4 illustrates a fully-connected layer having three inputs and two outputs. An input 400 is an input of the fully-connected layer. The input 400 includes 3 neurons: a neuron 401, a neuron 402, and a neuron 403. An input value of the neuron 401 is $x_1$, an input value of the neuron 402 is $x_2$, and an input value of the neuron 403 is $x_3$. An output 406 is an output of the fully-connected layer. The output 406 includes 2 neurons: a neuron 404 and a neuron 405. The expression fully-connected means that each neuron in the input 400 is connected to each neuron in the output 406. In addition, all connections between the neurons of the input 400 and the output 406 each include a weight. As shown in FIG. 4, these weights are $w_{11}$, $w_{21}$, $w_{12}$, $w_{22}$, $w_{13}$, and $w_{23}$. Each neuron of the output 406 includes a bias, a weighted input, and an output. As shown in FIG. 4, the neuron 404 has a bias $b_1$, a weighted input $z_1$, and an output $a_1$. The neuron 405 has a bias $b_2$, a weighted input $z_2$, and an output $a_2$. The weighted input $z_1$ is a weighted sum of neuron input values of the input 400 based on the weight and the bias, which is expressed as follows:

$$z_1 = w_{11}x_1 + w_{12}x_2 + w_{13}x_3 + b_1.$$

The weighted input $z_2$ is a weighted sum of neuron input values of the input 400 based on the weight and the bias, which is expressed as follows:

$$z_2 = w_{21}x_1 + w_{22}x_2 + w_{23}x_3 + b_2.$$

The output of the neuron 404 is $\alpha_1 = \alpha(z_1)$, where $\alpha(\cdot)$ is an activation function. Similarly, the output of the neuron 404 is $\alpha_2 = \alpha(z_2)$. When the activation function $\alpha(\cdot)$ is selected as an identity function, the output $\alpha_1$ and the output $\alpha_2$ form a linear combination of the neuron input values of the input 400.

The fully-connected layer shown in FIG. 4 is an operator, and the operation parameters of the operator are weights $w_{11}$, $w_{21}$, $w_{12}$, $w_{22}$, $w_{13}$, and $w_{23}$, a bias $b_1$, and a bias $b_2$.

It should be noted that FIG. 4 illustrates an example of a fully-connected layer having three inputs and two outputs. In general application of a neural network, the neural network may include a fully-connected layer having any number of inputs and any number of outputs. Generally, if the number of inputs of a fully-connected layer is M and the number of outputs is P, the fully-connected layer has M·P weights and P biases, where M and P are positive integers. Therefore, M·P+P operation parameters exist.

In application of the neural network, a commonly used operator is a normalized exponential function layer. The normalized exponential function layer is also referred to as a Softmax layer. The normalized exponential function layer performs Softmax operation on an input to obtain an output. The so-called Softmax operation means that when the input is [$y_1 \ldots y_n$], the output is $$\left[ \frac{e^{y_1}}{\sum_{i=1}^{n} e^{y_i}} \quad \cdots \quad \frac{e^{y_n}}{\sum_{i=1}^{n} e^{y_i}} \right].$$

The normalized exponential function layer has a dimension parameter. The dimension parameter specifies an input dimension on which the normalized exponential function layer performs the Softmax operation. The dimension parameter is an operation parameter of the normalized exponential function layer.

A manner in which the operators are connected is referred to as a neural network architecture of the neural network. The operation parameters of each operator are obtained through training. A training manner, a data set used during the training, and a connection manner of the operators determine the accuracy and efficiency of the operation of the neural network. The manner in which the operators are connected (that is, the neural network architecture of the neural network) is combined with the operation parameters obtained by training, so as to obtain a neural network model. A computer is used to operate the neural network model, that is, the operation of the neural network model is implemented.

In the embodiment shown in FIG. 1, each of the edge devices 102-1 to 102-N is configured to store a neural network architecture. The neural network architecture stored in each of the edge devices 102-1 to 102-N includes at least one operator and a model identifier corresponding to the neural network architecture. In addition, the operators of the neural network architecture stored in each of the edge devices 102-1 to 102-N include an operator identifier.

Referring to FIG. 2, a neural network model 200 shown in FIG. 2 is used as an example. A name of the neural network model 200 is Tiny Cony. The neural network model 200 has a model identifier 2001 and an encryption key 2002. The model identifier 2001 of the neural network model 200 is denoted as NN-UUID, and the encryption key 2002 of the neural network model 200 is denoted as $K_n$. The neural network model 200 has an operator 201, an operator 202, and an operator 203. The operator 201 is a convolution layer having the operator identifier is denoted as UUID-1. The operator 202 is a fully-connected layer having the operator identifier is denoted as UUID-2. The operator 203 is a normalized exponential function layer having the operator identifier is denoted as UUID-3. The connection manner for the operator 201, the operator 202, and the operator 203 (in the embodiment shown in FIG. 2, the operator 202 is connected after the operator 201, and the operator 203 is connected after the operator 202) and internal structures of the operator 201, the operator 202, and the operator 203 form the neural network architecture of the neural network model 200.

In some embodiments of the present invention, the model identifier (for example, NN-UUID) and the operator identifiers (for example, UUID-1, UUID-2, and UUID-3) are in a format of universally unique identifiers (UUID). In some embodiments of the present invention, the model identifier (for example, NN-UUID) and the operator identifiers (for example, UUID-1, UUID-2, and UUID-3) are in other coding formats. The coding format of the model identifier and the operator identifier is not limited in the present invention as long as the coding format can represent the neural network architecture and model and each operator and can be identified by the server 101.

The operation method for a neural network system in some embodiments of the present invention and how the modules of the neural network system 100 cooperate with each other are described below in detail with reference to the figures.

Figure 7:
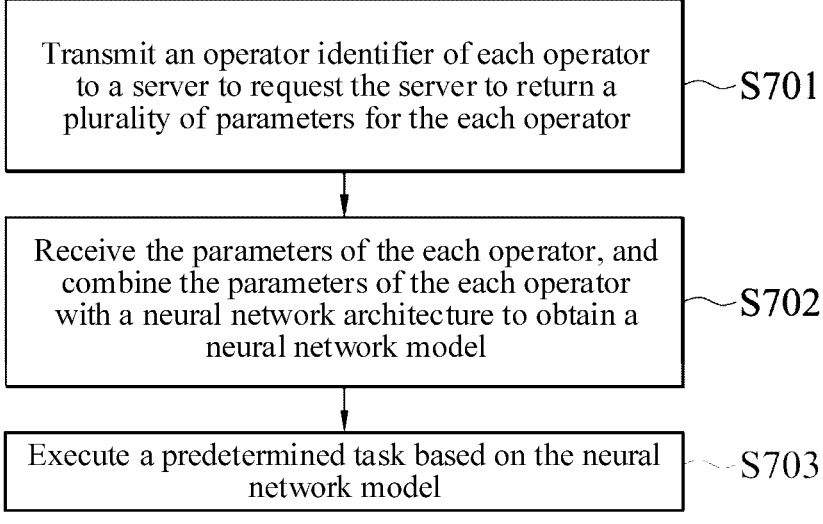
FIG. 7 is a flowchart of an operation method for a neural network system according to some embodiments of the present invention.

FIG. 7 is a flowchart of an operation method for a neural network system according to some embodiments of the present invention. Referring to FIG. 1, FIG. 2, and FIG. 7 together, in the embodiment shown in FIG. 7, the edge devices 102-1 to 102-N of the neural network system 100 perform steps S701-S703 after being powered on. The edge device 102-1 is used for description below. Certainly, the following description is also applicable to the edge devices 102-2 to 102-N.

In step S701, the edge device 102-1 transmits an operator identifier (for example, UUID-1, UUID-2, and UUID-3 shown in FIG. 2) of each operator (for example, the operator 201, the operator 202, and the operator 203 shown in FIG. 2) to the server 101 to request the server 101 to return operation parameters for the each operator. The server 101 finds latest operation parameters corresponding to the operator identifier stored in the server 101 according to the received operator identifier after receiving the request, and returns the latest operation parameters to the edge device 102-1.

In step S702, the edge device 102-1 receives the operation parameters of each operator returned by the server 101, and combines the operation parameters of all operators with the neural network architecture to obtain a neural network model (for example, the neural network model 200 shown in FIG. 2). In step S703, the edge device 102-1 executes a predetermined task based on the neural network model that has obtained the latest operation parameters.

It should be noted herein that the edge devices 102-1 to 102-N are not required to be simultaneously powered on, the edge devices 102-1 to 102-N may be powered on at different times according to requirements, and steps S701-S703 are performed upon being powered on.

In some embodiments of the present invention, the predetermined task includes that after the edge device 102-1 preprocesses a captured image to obtain a pre-processed image in a format that can be operated by the neural network model (for example, the neural network model 200 shown in FIG. 2), the pre-processed image is used as the input of the neural network model (for example, the neural network model 200 shown in FIG. 2) to operate the neural network model.

In some embodiments of the present invention, the edge device 102-1 uses the preprocessed image as the input of the neural network model (for example, the neural network model 200 shown in FIG. 2) and operates the neural network model to obtain an operation result. The edge device 102-1 encrypts the obtained operation result by using an encryption key (for example, the encryption key 2002 of the neural network model 200 shown in FIG. 2) of the neural network model, and the encrypted operation result is marked with the model identifier (for example, the model identifier 2001 shown in FIG. 2, denoted as NN-UUID) and the marked encrypted operation result is returned to the server 101. The server 101 finds a decryption key corresponding to the encryption key of the neural network model based on the model identifier (for example, the model identifier 2001 shown in FIG. 2, denoted as NN-UUID), to decrypt and process the operation result. In an embodiment of the present invention, the processed operation result includes new operation parameters calculated based on the operation result.

In some embodiments of the present invention, after the edge device 102-1 is powered off, the operation parameters of each operator disappear. After the edge device 102-1 is powered on again, the edge device 102-1 performs steps S701-S703 to obtain the operation parameters of all operators and obtain a neural network model, and executes the predetermined task according to the neural network model.

Figures 1, 5:
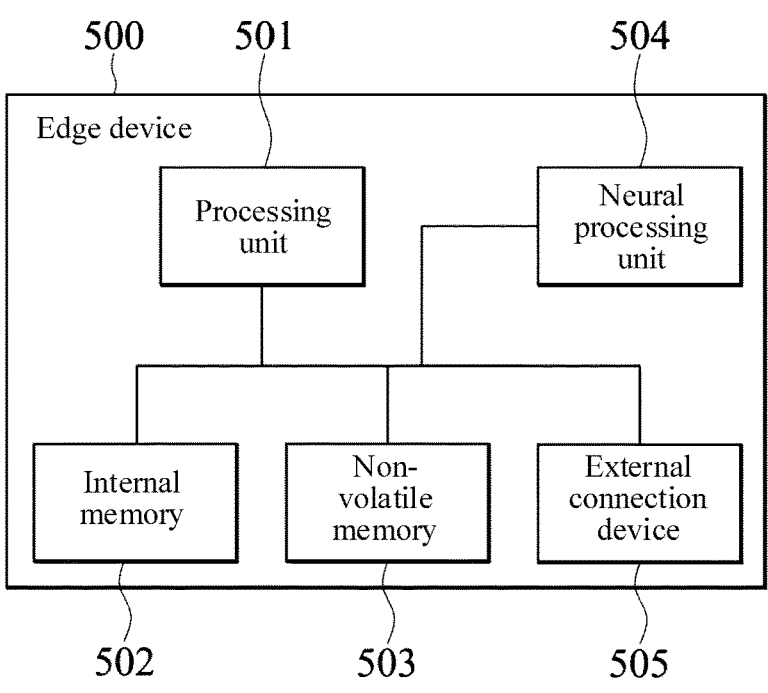
Figures 2, 5:
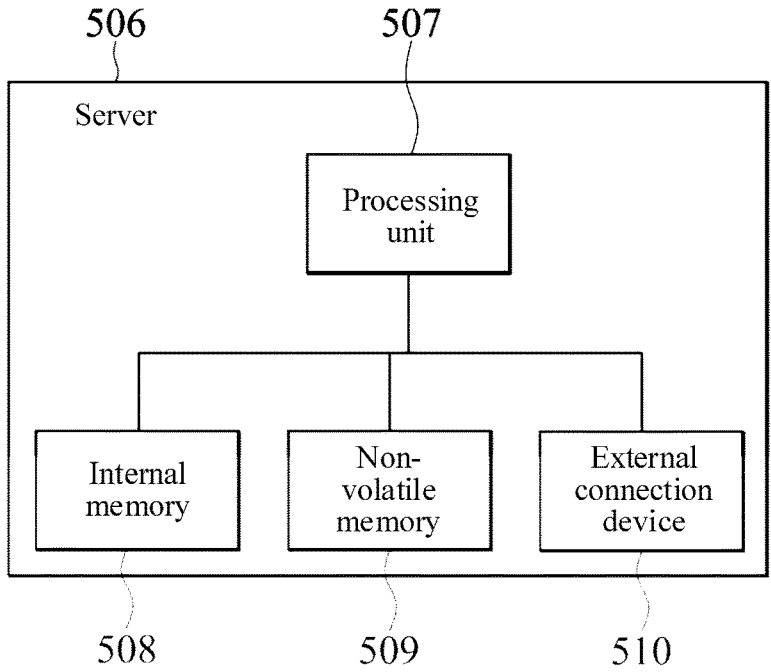

FIG. 5-1 is a block diagram of an edge device system according to an embodiment of the present invention. FIG. 8 is a flowchart of an operation method for a neural network system according to an embodiment of the present invention. FIG. 9 is a flowchart of an operation method for a neural network system according to an embodiment of the present invention. Refer to FIG. 1, FIG. 5-1, and FIG. 8 together. In an embodiment of the present invention, architectures of the edge devices 102-1 to 102-N are the same as that of the edge device 500. The edge device 500 includes a processing unit 501, an internal memory 502, a non-volatile memory 503, a neural processing unit (NPU) 504, and an external connection device 505. In some embodiments of the present invention, the external connection device 505 is a network module, and the edge device 500 is connected to the server 101 by the external connection device 505 via the Internet. The non-volatile memory 503 stores firmware of the edge device 500. The firmware stores the neural network architecture of the edge device 500.

When the firmware of one of the edge devices 102-1 to 102-N is required to be updated, the neural network system 100 performs step S801. In step S801, the server 101 transmits updated firmware to a to-be-updated edge device in the edge devices 102-1 to 102-N, so as to update the firmware of the to-be-updated edge device. Since the neural network architectures of the edge devices 102-1 to 102-N are stored in the respective firmware, the server 101 may correspondingly update, by updating the firmware of the edge devices 102-1 to 102-N, the neural network architecture stored in the respective firmware.

Refer to FIG. 1, FIG. 5-1, and FIG. 9 together. In an embodiment of the present invention, the edge devices 102-1 to 102-N of the neural network system 100 perform step S901 upon being powered on. The edge device 102-1 is used for description below. Certainly, the following description is also applicable to the edge devices 102-2 to 102-N. As described above, in the embodiment, the edge device 102-1 stores the neural network architecture of the edge device 102-1 in the firmware. In step S901, the processing unit 501 of the edge device 102-1 executes the firmware, and the processing unit 501 of the edge device 102-1 initializes the neural processing unit 504 of the edge device 102-1 based on the firmware and the neural network architecture of the edge device 102-1 included in the firmware. After the edge device 102-1 receives the operation parameters of each operator returned by the server 101, the processing unit 501 of the edge device 102-1 loads the operation parameters of each operator into the internal memory 502 of the edge device 102-1. A neural network model (for example, the neural network model 200 shown in FIG. 2) may be obtained by combining the operation parameters of the each operator with the neural network architecture. The edge device 102-1 executes a predetermined task based on the neural network model that has obtained the operation parameters.

FIG. 5-2 is a block diagram of a server system according to an embodiment of the present invention. Refer to FIG. 1, FIG. 5-1, and FIG. 5-2 together. In an embodiment of the present invention, an architecture of the server 101 is the same as that of a server 506. The server 506 includes a processing unit 507, an internal memory 508, a non-volatile memory 509, and an external connection device 510. The non-volatile memory 509 stores operation parameters corresponding to each operator identifier and a decryption key corresponding to an encryption key of the neural network model. The processing unit 507 loads, into the internal memory 508 for processing when needed, the operation parameters corresponding to the each operator identifier and the decryption key corresponding to the encryption key of the neural network model that are stored in the non-volatile memory 509. The server 506 is connected to the edge devices 102-1 to 102-N through the external connection device 510. In some embodiments of the present invention, the external connection device 510 is a network module, and the server 101 is connected to the edge devices 102-1 to 102-N by the external connection device 510 via the Internet.

Figure 6:
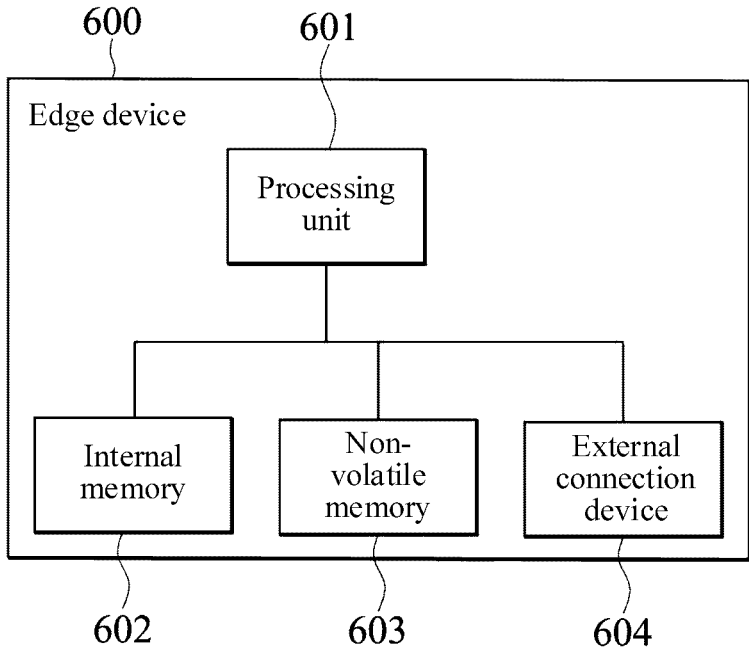
FIG. 6 is a block diagram of an edge device system according to an embodiment of the present invention.

FIG. 6 is a block diagram of an edge device system according to an embodiment of the present invention. Refer to FIG. 1 and FIG. 6 together. In an embodiment of the present invention, architectures of the edge devices 102-1 to 102-N are the same as that of an edge device 600. The edge device 600 includes a processing unit 601, an internal memory 602, a non-volatile memory 603, and an external connection device 604. In some embodiments of the present invention, the external connection device 604 is a network module, which has same functions as the external connection device 505. The non-volatile memory 603 stores a neural network architecture of the edge device 600.

Refer to FIG. 1 and FIG. 6 together. In the embodiment, the edge devices 102-1 to 102-N of the neural network system 100 performs step S701 upon being powered on. The edge device 102-1 is used for description below. Certainly, the following description is also applicable to the edge devices 102-2 to 102-N. In step S701, the edge device 102-1 transmits an operator identifier (for example, UUID-1, UUID-2, and UUID-3 shown in FIG. 2) of each operator (for example, the operator 201, the operator 202, and the operator 203 shown in FIG. 2) to the server 101 to request the server 101 to return operation parameters for the each operator. The server 101 finds latest operation parameters corresponding to the operator identifier stored in the server 101 according to the received operator identifier after receiving the request, and returns the latest operation parameters to the edge device 102-1. After step S701 is performed, the processing unit 601 of the edge device 102-1 loads the operation parameters of the each operator into the internal memory 602 of the edge device 102-1. The processing unit 601 of the edge device 102-1 loads the neural network architecture of the edge device 102-1 from the non-volatile memory 603 into the internal memory 602 of the edge device 102-1. The processing unit 601 of the edge device 102-1 combines the operation parameters of the each operator of the edge device 102-1 with the neural network architecture of the edge device 102-1 to obtain a neural network model (for example, the neural network model 200 shown in FIG. 2) of the edge device 102-1. After the neural network model of the edge device 102-1 is obtained, the edge device 102-1 performs step S703 again.

Refer to FIG. 1 and FIG. 7 again. As described above, when the server 101 receives requests from the edge devices 102-1 to 102-N (for example, the edge device 102-1 transmits a request), the server 101 finds, according to the received operator identifier, the latest operation parameters corresponding to the operator identifier stored in the server 101, and returns the latest operation parameters back to the edge device (for example, the edge device 102-1) that transmits the request.

In some embodiments of the present invention, the server 101 returns, to an edge device (for example, the edge device 102-1) that transmits the request, the operation parameters encrypted by a key. That is to say, the operation parameters of each operator received by the edge device (for example, the edge device 102-1) that transmits the request are encrypted by the above key. In addition, in the embodiment, step S702 includes: decrypting the received operation parameters of each operator, and combining the decrypted operation parameters of the each operator with the neural network architecture to obtain a neural network model.

In some embodiments of the present invention, the server 101 returns, to the edge device (for example, the edge device 102-1) that transmits the request, the operation parameters stirred according to a specific sequence. That is to say, the operation parameters of the each operator received by the edge device (for example, the edge device 102-1) that transmits the request are stirred according to the specific order. In addition, in the embodiment, step S702 includes: restoring the received operation parameters of each operator, and combining the restored operation parameters of the each operator with the neural network architecture to obtain a neural network model.

In some embodiments of the present invention, the server 101 returns, as a plain code, the operation parameters to the edge device (for example, the edge device 102-1) that transmits the request.

In some embodiments of the present invention, the edge devices 102-1 to 102-N use a real-time operating system (RTOS) as an operating system of each of the edge devices 102-1 to 102-N.

Refer to FIG. 5-1, FIG. 5-2, and FIG. 6 together. The internal memories 502, 508, and 602 and the non-volatile memories 503, 509, and 603 are configured to store a program. The program may include program code, and the program code includes computer operation instructions. The internal memory 502 and the non-volatile memory 503 provide instructions and data to the processing unit 501, the internal memory 508 and the non-volatile memory 509 provide instructions and data to the processing unit 507, and the internal memory 602 and the non-volatile memory 603 provide instructions and data to the processing unit 601. The processing unit 501 reads the corresponding computer program from the non-volatile memory 503 into the internal memory 502 and runs the program, the processing unit 507 reads the corresponding computer program from the non-volatile memory 509 into the internal memory 508 and runs the program, and the processing unit 601 reads the corresponding computer program from the non-volatile memory 603 into the internal memory 602 and then runs the program.

The processing units 501, 507, and 601 may be a type of integrated circuit chip with signal processing capability. During implementation, the methods and the corresponding steps disclosed in the foregoing embodiments may be completed by an integrated logic circuit in a hardware form in the processing units 501, 507, and 601 or the instruction in a software form. The processing units 501, 507, and 601 may be a general purpose processor, including a central processing unit (CPU), a digital signal processor (DSP), an application-specific integrated circuit (ASIC), a field-programmable gate array (FPGA) or another programmable logic device that may implement or perform the corresponding methods and steps disclosed in the foregoing embodiments. Embodiments of the present specification further provide a computer-readable storage medium. The computer-readable storage medium stores at least one instruction, the at least one instruction, when executed by the processing units 501, 507, and 601, causing the processing units 501, 507, and 601 to perform the corresponding methods and steps disclosed in the foregoing embodiments. Examples of a computer storage medium include but are not limited to a phase change memory (PRAM), a static random access memory (SRAM), a dynamic random access memory (DRAM), other types of random access memories (RAM), a read-only memory (ROM), an electrically erasable programmable read-only memory (EEPROM), a flash memory or other memory technologies, a compact disk read-only memory (CD-ROM), a digital versatile disc (DVD) or other optical storages, a cartridge storage, a magnetic tape disk storage or other magnetic storage devices or any other non-transmitting medium that may be configured to store information accessible by a computing device. According to the definition herein, the computer-readable medium does not include transitory computer-readable media, such as modulated data signals and carriers.

Based on the above, according to the neural network system and the operation method for a neural network system provided in some embodiments of the present invention, the operator is used as a basic update unit to update the parameters of the neural network operator. Since the neural network architecture of the neural network model is preloaded into the edge device, the composition of the neural network is not required to be publicly transmitted on the Internet. In addition, since a name of the neural network and a category of the operator are replaced with identifiers, the important content of the neural network can be shielded, so that the outsider cannot reason about the details. In the neural network system provided in some embodiments of the present invention, the edge device of the neural network system includes a neural processing unit and stores the neural network architecture in the firmware. Therefore, when the edge device is powered on, that is, when the neural processing unit is initialized, the neural processing unit can be initialized in advance. In addition, due to the configuration of the neural processing unit, the operation of the neural network model can be accelerated.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of protected invention shall be defined by the appended claims below.

What is claimed is:

1. A neural network system, comprising:

at least one edge device, each configured to store a neural network architecture, wherein the neural network architecture stored in each of the at least one edge device comprises at least one operator and a model identifier, and the at least one operator of the neural network architecture stored in the each edge device comprises an operator identifier; and a server, connected to the at least one edge device, wherein each of the at least one edge device is configured to, upon being powered on, (a) transmit the operator identifier of each of the at least one operator to the server to request the server to return a plurality of parameters for each of the at least one operator;

(b) receive the parameters of each of the at least one operator, and combine the parameters of each of the at least one operator with the neural network architecture to obtain a neural network model; and (c) execute a predetermined task based on the neural network model.

2. The neural network system according to claim 1, wherein each of the at least one edge device comprises firmware, and the firmware of each of the at least one edge device comprises the respective neural network architecture.

3. The neural network system according to claim 2, wherein the server is configured to transmit updated firmware to a to-be-updated edge device of the at least one edge device to update the neural network architecture of the to-be-updated edge device.

4. The neural network system according to claim 2, wherein each of the at least one edge device comprises a processing unit and a neural processing unit, and each of the at least one edge device is configured to, upon being powered on, initialize the neural processing unit through the processing unit based on the firmware and the neural network architecture comprised in the firmware.

5. The neural network system according to claim 1, wherein the parameters of each of the at least one operator received by each of the at least one edge device are encrypted by a key, and step (b) comprises: decrypting the received parameters of each of the at least one operator, and combining the decrypted parameters of each of the at least one operator with the neural network architecture to obtain the neural network model.

6. The neural network system according to claim 1, wherein the parameters of each of the at least one operator received by each of the at least one edge device are stirred according to a specific order, and step (b) comprises: restoring the received parameters of each of the at least one operator, and combining the restored parameters of each of the at least one operator with the neural network architecture to obtain the neural network model.

7. The neural network system according to claim 1, wherein the parameters of each of the at least one operator received by each of the at least one edge device are transmitted as a plain code.

8. The neural network system according to claim 1, wherein the operator identifier of the at least one operator of the neural network architecture stored in each of the at least one edge device is in a format of a universally unique identifier (UUID).

9. An operation method for a neural network system, applicable to a neural network system, wherein the neural network system comprises: at least one edge device, each configured to store a neural network architecture, wherein the neural network architecture stored in each of the at least one edge device comprises at least one operator and a model identifier, and the at least one operator of the neural network architecture stored in the each edge device comprises an operator identifier; and a server, connected to the at least one edge device; and the operation method for a neural network system comprises: performing, by each of the at least one edge device upon being powered on, steps of:

(a) transmitting the operator identifier of each of the at least one operator to the server to request the server to return a plurality of parameters for each of the at least one operator;

(b) receiving the parameters of each of the at least one operator, and combining the parameters of each of the at least one operator with the neural network architecture to obtain a neural network model; and (c) executing a predetermined task based on the neural network model.

10. The operation method for a neural network system according to claim 9, wherein each of the at least one edge device comprises firmware, and the firmware of each of the at least one edge device comprises the respective neural network architecture.

11. The operation method for a neural network system according to claim 10, comprising:

transmitting, by the server, updated firmware to a to-be-updated edge device of the at least one edge device to update the neural network architecture of the to-be-updated edge device.

12. The operation method for a neural network system according to claim 10, wherein each of the at least one edge device comprises a processing unit and a neural processing unit, and the operation method for a neural network system comprises: performing, by each of the at least one edge device upon being powered on, a step of:

initializing the neural processing unit through the processing unit based on the firmware and the neural network architecture comprised in the firmware.

13. The operation method for a neural network system according to claim 9, wherein the parameters of each of the at least one operator received by each of the at least one edge device are encrypted by a key, and step (b) comprises: decrypting the received parameters of each of the at least one operator, and combining the decrypted parameters of each of the at least one operator with the neural network architecture to obtain the neural network model.

14. The operation method for a neural network system according to claim 9, wherein the parameters of each of the at least one operator received by each of the at least one edge device are stirred according to a specific order, and step (b) comprises: restoring the received parameters of each of the at least one operator, and combining the restored parameters of each of the at least one operator with the neural network architecture to obtain the neural network model.

15. The operation method for a neural network system according to claim 9, wherein the parameters of each of the at least one operator received by each of the at least one edge device are transmitted as a plain code.

16. The operation method for a neural network system according to claim 9, wherein the operator identifier of the at least one operator of the neural network architecture stored in each of the at least one edge device is in a format of a universally unique identifier (UUID).

* * * * *